Dec. 15, 1964  J. H. TODT  3,161,726
DISPLAY PANEL COMPRISED OF A PLURALITY OF
MAGNETICALLY-CONTROLLED, MOVABLE, LIGHT
REFLECTING, THIN PANELS

Filed Feb. 13, 1961  9 Sheets-Sheet 1

INVENTOR.
JOACHIM H. TODT
BY *Kenneth D. Siegfried*

ATTORNEY

Dec. 15, 1964 J. H. TODT 3,161,726
DISPLAY PANEL COMPRISED OF A PLURALITY OF
MAGNETICALLY-CONTROLLED, MOVABLE, LIGHT
REFLECTING, THIN PANELS
Filed Feb. 13, 1961 9 Sheets-Sheet 2

INVENTOR.
JOACHIM H. TODT

BY Kenneth D. Siegfried

ATTORNEY

Dec. 15, 1964   J. H. TODT   3,161,726
DISPLAY PANEL COMPRISED OF A PLURALITY OF
MAGNETICALLY-CONTROLLED, MOVABLE, LIGHT
REFLECTING, THIN PANELS
Filed Feb. 13, 1961   9 Sheets-Sheet 5

*INVENTOR.*
JOACHIM H. TODT
BY Kenneth D. Siegfried
ATTORNEY

INVENTOR.
JOACHIM H. TODT
BY Kenneth D. Siegfried
ATTORNEY

Dec. 15, 1964   J. H. TODT   3,161,726
DISPLAY PANEL COMPRISED OF A PLURALITY OF
MAGNETICALLY-CONTROLLED, MOVABLE, LIGHT
REFLECTING, THIN PANELS

Filed Feb. 13, 1961   9 Sheets—Sheet 7

INVENTOR.
JOACHIM H. TODT
BY Kenneth D. Siegfried
ATTORNEY

Dec. 15, 1964 J. H. TODT 3,161,726
DISPLAY PANEL COMPRISED OF A PLURALITY OF
MAGNETICALLY-CONTROLLED, MOVABLE, LIGHT
REFLECTING, THIN PANELS
Filed Feb. 13, 1961 9 Sheets-Sheet 9

INVENTOR.
JOACHIM H. TODT
BY
ATTORNEY

United States Patent Office 3,161,726
Patented Dec. 15, 1964

3,161,726
DISPLAY PANEL COMPRISED OF A PLURALITY OF MAGNETICALLY-CONTROLLED, MOVABLE, LIGHT REFLECTING, THIN PANELS
Joachim H. Todt, Minneapolis, Minn., assignor to Maico Electronics, Incorporated, Minneapolis, Minn., a corporation of Minnesota
Filed Feb. 13, 1961, Ser. No. 88,881
20 Claims. (Cl. 178—7.3)

This invention relates to the field of electrical apparatus and more particularly to the field of visual display apparatus.

For sometimes the electronics industry has been seeking a display panel which incorporates more of the features generally found in a cathode ray presentation, but one which avoids the use of high voltages and electron guns such as found in cathode ray tubes. Numerous attempts have been made to substitute display panels using electroluminescent techniques in devising display panels which can take the place of present day cathode ray tube displays. However, much difficulty has been encountered in achieving the same quality of operation in an electroluminescent panel that can be obtained in a cathode ray tube. Furthermore, electroluminescent panels generally are no larger in size than the general applications made to cathode ray tubes such as displays for television, radar, and oscilloscope purposes. The control of the energizing voltages for electroluminescent panels is quite critical and should an overvoltage be applied, one of the electroluminescent rows or columns may develop an open electrical circuit thereby disabling the operation of the panel. Probably the most important disadvantage in using electroluminescent panels is the relatively high cost of manufacturing the panel itself. While present day electroluminescent panels may be constructed in more compact size than the cathode ray tube, the low cost of the cathode ray tube has made its use much more desirable regardless of its increased size and bulk.

My invention contemplates the use of a well-established principle that when a magnetic element is placed in a magnetic field, similar poles repel and dissimilar poles attract each other. Therefore, if a symmetrical pattern of small light reflecting elements which have magnetic properties can be manipulated in a magnetic field, a display panel can be fabricated which avoids the disadvantages of present day display panels and yet provides a display of equal definition to those in use at the present time. Specifically, my invention makes use of a plurality of reflectors which are made from a thin film material having magnetic properties which can be moved from a first predetermined position to a second predetermined position and thereby direct light, towards or away from, an observer depending upon the angle of incidence between the light source and the reflective element. In order to control the plurality of reflective elements, they are arranged in columns and rows and are sequentially scanned so as to produce the same type of display which is obtained through present day display panels.

My panel may be made in several different forms, all utilizing the same principle that the magnetic and reflective element will be either attracted or repelled by an adjacent magnetic field. In fact, there is no limitation as to the size for which the panel may be constructed and it may be applied to such uses as billboards, scoreboards, weather forecasting, blackboards, movie screens for both outdoor and indoor operation, military command displays, flight control panels, traffic control displays for aircraft, television, radar and numerous other applications. In fact, the panel probably achieves its greatest utility in the field of large panel displays such as billboards which may be animated and in the field of colored television transmission and reception. For certain forms of the invention, it may be desirable to use vacuum deposition methods in placing conductors upon the thin film reflective elements themselves. In fact, well known techniques of etching and vapor deposition may be used in practicing my invention.

It is therefore a general object of the present invention to provide an improvement in the field of data display panels and particularly in the area of manufacturing of display panels.

It is another object of this invention to provide a compact display which is much reduced in size and weight over present display panels.

It is a further object of the present invention to provide a panel which will display either colored or gray images.

It is yet another object of the present invention to provide a display panel in which the principle of operation may be used on a small panel as well as a large panel.

It is another object of the present invention to eliminate the use of high voltages and the corresponding circuits in the operation of the display panel.

It is still another object of this invention to provide a panel which operates without the use of filaments and electron guns.

It is another object of this invention to provide a display panel using an external light source of any kind but of proper shape.

It is a further object of the present invention to provide a display panel having a "memory" for certain applications.

It is still another object of this invention to provide a display panel using thin film which has magnetic properties.

It is a further object of this invention to provide a display panel using a controlled magnetic field to determine the amount of light reflection viewing by the observer.

It is still a further object of the present invention to provide a display panel operating on magnetic principles.

It is yet another object of this invention to provide a display panel in which the operable elements are arranged in columns and rows.

It is still a further object of this invention to provide a display panel which is controlled by movable conductors in a magnetic field.

It is yet another object of this invention to provide a display panel, the movable elements of which are driven by stationary conductors in a magnetic field.

It is yet another object of this invention to provide a display panel using controllable light reflective elements.

It is a further object of this invention to provide a display panel using electronic scanning circuits.

It is a further object of this invention to provide a display panel which may be used with scanning and television circuits.

It is yet another object of this invention to provide a display panel which will operate from television signals and present color or black and white images.

It is still a further object of the present invention to provide a display panel using electrical conductors which are formed from metal clad plastic sheets.

These and other features of the invention will become more apparent from the accompanying drawings where similar reference characters designate corresponding parts and in which.

Figure 7:
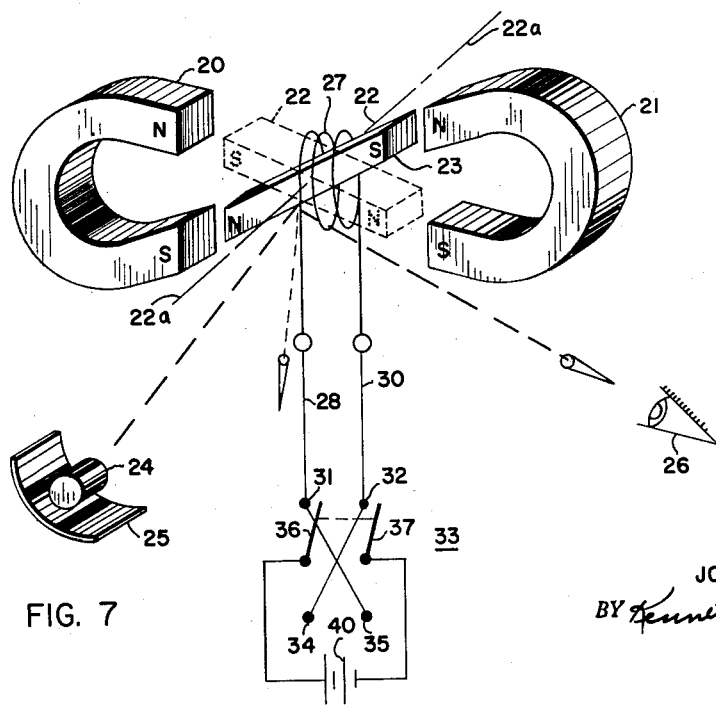
FIGURE 7 is an illustrative diagram showing the general principles of operation of the invention.

The general principles of operation of my invention can best be understood by turning to the drawing of FIGURE 7. A pair of magnets 20 and 21 are shown which are generally in a horseshoe or U-shaped form with the pole pieces at the open end of the horseshoe or U-shape. Each magnet has a north and south pole and as shown, the north and south poles are opposite each other as are the open ends of the horseshoe magnets. Situated between magnet 20 and 21 is a bar 22 having magnetic properties, that is, bar 22 is made of a material which will retain a magnetic field when such a field is impressed upon the element. Furthermore, bar 22 has a reflective surface 23 which is generally shown on the lower side of bar 22. Situated below magnet 20 and below bar 22, is a light source 24 having a reflector 25 which has a parabolic shape. Reflector 25 directs the light from source 24 towards light reflective surface 23 so that for certain positions of bar 22 light is reflected away from surface 23 and generally to the right under magnet 21 towards the position an observer might take designated by a reference 26. Surrounding bar 22 is a coil 27 which has a pair of connecting leads 28 and 30. Connecting leads 28 and 30 are respectively connected to a pair of terminals 31 and 32 of a double pole double throw switch 33. Another pair of terminals 34 and 35 are connected to terminals 32 and 31 respectively. A pair of switch arms 36 and 37 are connected to a battery 40 and are insulatedly connected together. Switch 33 is wired in the form of reversing switch so that current may be caused to flow towards coil 27 in connecting lead 28 for one cycle of operation and towards coil 27 through connecting lead 30 for another cycle of operation which is controlled by the position of switch arms 36 and 37. Applying the magnetic right hand rule, the positive direction of the resulting flux density is such that the fingers of the right hand will encircle the wire, pointing in the direction of positive flux density if the thumb is pointed in the direction of current flow. In other words, if current is caused to flow in connecting lead 28 towards coil 27, a field will be established in which a north pole is created (assuming this to be the positive pole) at the left hand side of element 22 and a south pole will be created at the right hand end of element 22. The additional turns of coil 27 merely increase the magnetic flux density since the current flows in the same direction for all turns on any one given side of element 22. In like manner, upon a reversal of the current so that it flows towards coil 27 through conducting lead 30, the north and south poles would be reversed. Applying the principles of magnetic fields, if element 22 is magnetized such that the left end is magnetized north, it will be magnetically attracted to the south pole of magnet 20 such as is shown in the solid line diagram. Similarly magnet 21 will have its north pole opposite the south pole of element 22. If the material of element 22 is such that it will retain a certain magnetic field this field will aid in keeping element 22 positioned between the attracting poles of magnets 20 and 21. When switch 33 is reversed, element 22 will have its field reversed and the magnetic poles which will also reverse, will now be repelled and attracted towards the other legs of the horseshoe magnets 20 and 21. It can readily be seen that it makes no difference, whether the element 22 moves within coil 27 or whether coil 27 is physically attached to element 22 if element 22 is allowed to pivot or rotate about its axis 22a. It will also become apparent that by manipulation of the magnetic pole pieces of magnets 20 and 21 that the angle through which element 22 is moved can be increased or decreased. Again, this magnetic field may be shifted by increasing or shading the magnetic field created by the permanent magnets. It may also be observed that coil 27 may have its turns separated so that the greater majority of the coils are adjacent to and cooperating with the pole pieces of magnets 20 and 21. Positioning the coils may be accomplished by attaching them to element 22 or placing them behind element 22, or in the air gaps between element 22 and the pole pieces of magnets 20 and 21.

Figure 3:
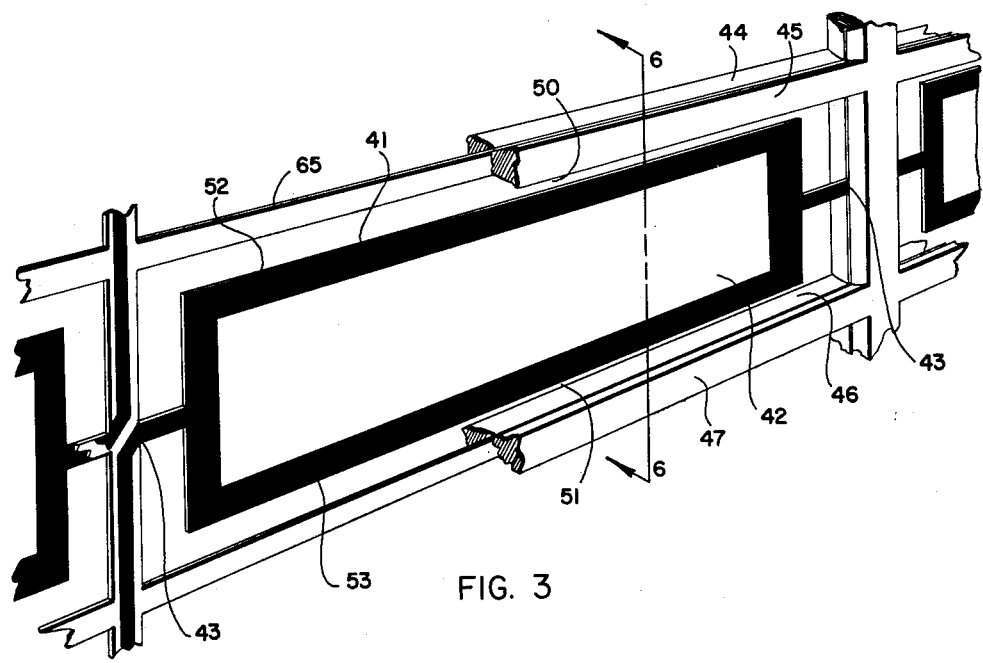
FIGURE 3 is a broken away view of one light reflective element situated in a magnetic grid structure.
Figure 5:
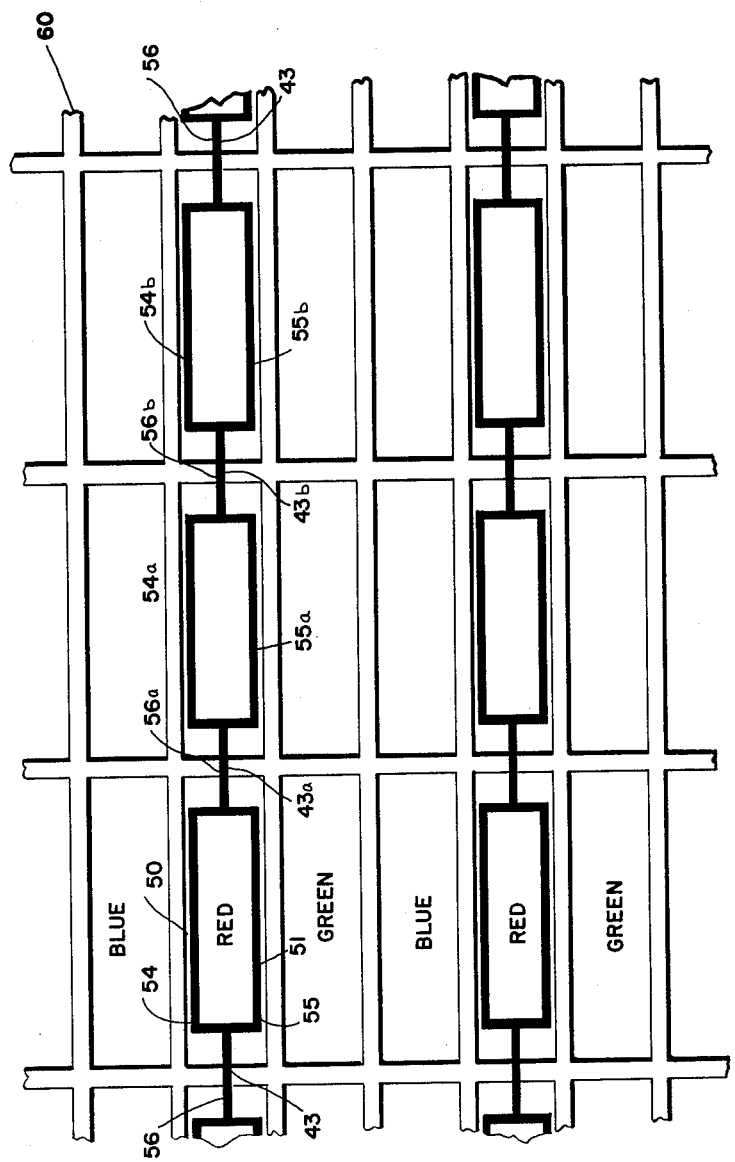
FIGURE 5 is a rear view of the light reflective elements showing the row electrical conductors on the rear side of the light reflective elements.
Figure 6:
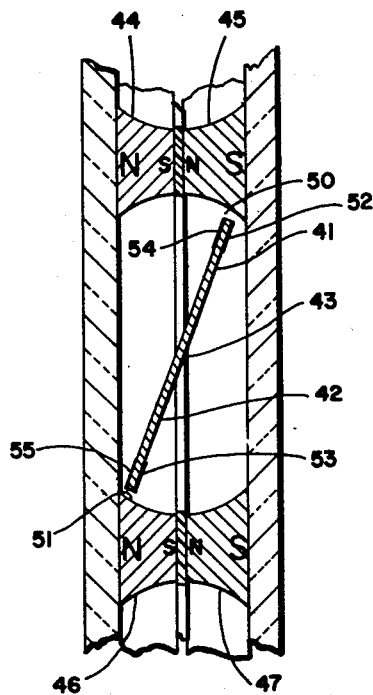
FIGURE 6 is a cross sectional view taken along section lines 6—6 of FIGURE 3.

FIGURES 3 and 6 show a partial front view and a cross sectional view of a thin film such as 65 where element 41 has a reflecting surface 42 on the front surface. Thin film 41 may be made of molybdenum permalloy which is a nickel-iron compound ranging in thickness from $0.50 \times 10^{-3}$ to $0.125 \times 10^{-3}$ inches in thickness. It will, of course, be understood that different thicknesses may be used for certain applications and for certain applications such as television, the film may be much thinner. Reflective element 41 is formed from a sheet of thin film molybdenum permalloy and is rotated at a pivot point 43 which is in the form of a hinge. This may be seen more readily in FIGURES 4 and 5. A pair of magnets 44 and 45 are formed of a material such as Lodex which comprises approximately 50% lead and 50% elongated single domain iron or a compound of gamma ferric oxide imbedded in polyethylene. Magnets 44 and 45 may be in the shape of a bar having its sides curved which are adjacent the edge of element 41 to form a uniform air gap. Similarly, a pair of magnets 46 and 47 are located at the opposite ends of thin film reflective element 41. Between thin film element 41 and magnets 44 and 45 is an air gap 50 and situated between thin film element 41 and magnets 46 and 47 is an air gap 51. Structure similar to the coil 27 of FIGURE 7 is formed by attaching a pair of conductors 52 and 53 on the front surface at the outer edge of element 41 and by a pair of conductors 54 and 55 on the back surface at the outer edge of element 41. Elements 52 and 53 are joined at the hinge area 43, as are conductors 54 and 55 on the back surface. In other words, a complete closed loop is formed around the edges of the front and back surface of reflecting element 41. A more detailed drawing of the conductors on the front and back surfaces may be found in FIGURES 4 and 5, which will be described in more detail later. To be more specific, it will be seen that when current is passed through the conductors on either the front, or back side, of element 41 that the current flows in the same direction in conductors 52 and 53, and will flow in the same direction in conductors 54 and 55, it being understood that current does not necessarily flow in the same direction in the conductors on the front surface of element 41 as on the back surface of element 41. In other words, in one condition the two currents would be aiding each other whereas in the other condition they would be opposing each other where the conductors such as 52 and 54, and 53 and 55 are adjacent one another. By comparison to FIGURE 7 it will be seen that element 41 may have a north pole near air gap 50 and a south pole near air gap 51 caused by current flow in one direction and have a south pole near air gap 50 and a north pole near air gap 51 caused by current flow in the other direction. Therefore, the same magnetic conditions are reproduced in the thin film element 41 so that element 41 may be caused to rotate from an unlike pole to a like pole. Depending upon the rotational position of element 41 and its light reflecting surface 43, light will be reflected towards or away from the observer.

Figure 4:
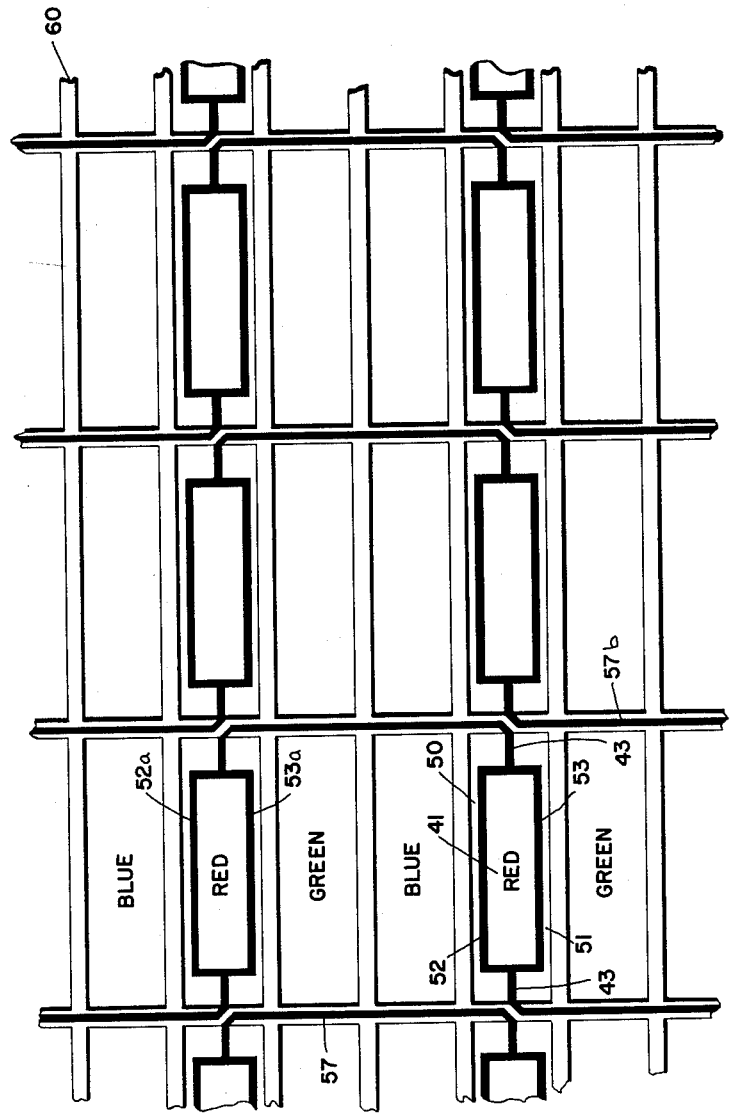
FIGURE 4 is a front view showing the column driving conductors situated on the light reflective elements.

In order to properly provide the necessary and correct currents to cause rotation of light reflecting element 41, one half of the current is applied to the conductors 54 and 55 on the back side of element 41 and the other half of the current is applied to conductors 52 and 53 on the front side of element 41. So that the elements may be scanned in their proper sequence, all of the elements appearing in one row, that is in a horizontal row, are connected together on the back side of the reflecting elements. This is shown in FIGURE 5 where conductors 54 and 55 are connected to conductors 54a, and 55a respectively as well as 54b and 55b respectively. These conductors are interconnected by a series of conductors, 56, 56a, 56b, etc. For certain applications, where it is desirous of producing a colored image, all of the reflective elements 41 having the same primary color are interconnected in each column and this is shown in FIGURE 4. Conductors 52 and 53 are connected to conductors 52a and 53a respectively through a conductor 57 and in turn like elements are connected through similar conductors 57a, 57b, etc. It may also be noted in FIGURES 4 and 5 that a sheet of molybdenum permalloy 60 is cut or etched so that only one third of the reflective elements 41 are produced in each sheet. Similar sheets using a similar construction would be provided for the other primary colors such as blue and green, FIGURES 4 and 5 showing the arrangement for the red colored elements 41. This arrangement is shown in more detail in FIGURE 2 where a transparent sheet 61 forms the rear outside member of a panel 62. This sheet 61 may be formed from methyl methacrylate commonly known as Plexiglas, or other suitable materials including glass. Situated adjacent to, but inwardly of element 61, is a magnetic lattice 63 which may be formed of gamma ferric oxide imbedded in polyethylene or Lodex such as mentioned previously or any other means including an electromagnetic lattice. Sandwiched between magnetic lattice 63 and another magnetic lattice 64 which is forward of magnetic lattice 63, are three sheets of molybdenum permalloy 65, 66 and 67 which have reflective elements 41 formed therein such as found in FIGURES 4 and 5. Magnetic lattice 64 which is located near the front side of panel 62 has a transparent sheet 70 at its front surface to protect the small reflective elements 41. Also, sheets 61 and 70 may be clamped together or held in position to securely position the magnetic lattices 63 and 64 in the proper separating position where they are shown as elements 44, 45, 46, and 47 of FIGURE 6. Sheet 65 will have its reflective elements colored by a primary color such as found in FIGURES 4 and 5. In like manner, sheets 66 and 67 will have the reflective elements 41 colored a second primary color so that the three sheets form the three primary colors for an additive color scheme. When the entire panel is assembled, it will appear as panel 62 shown in FIGURE 1 and each group of three primary colors such as blue, red, and green will form one basic color dot or spot. In other words, as seen by the naked eye, from a suitable viewing distance, there will appear to be only one dot or color spot which will convey the proper color as represented by the proper current signals applied to the correct conductors on the elements 41.

Figure 1:
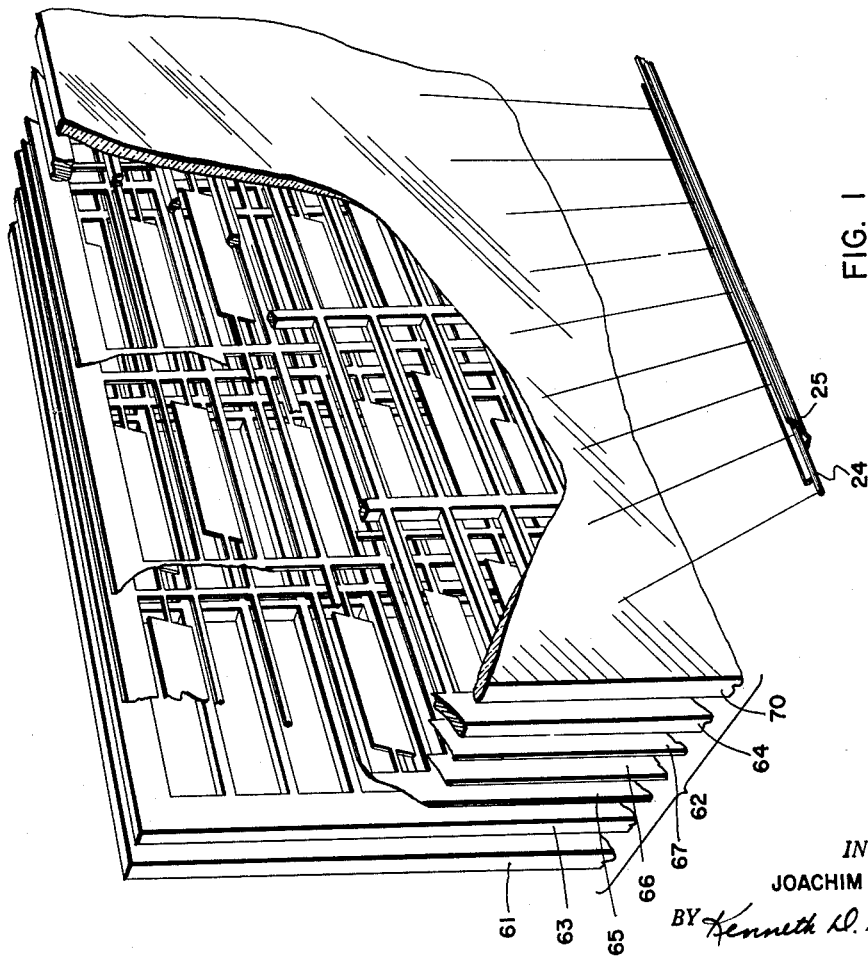
FIGURE 1 is a partial front view showing in general from the display panel and external light source.

FIGURE 1 shows a front view of a portion of panel 62 making use of the three primary colors and reflecting light from light source 24 as aided by reflector 25. For most applications, it may be beneficial to have the primary color reflecting elements approximately three times as long as they are wide in order to produce what appears to be one color spot.

Figure 2:
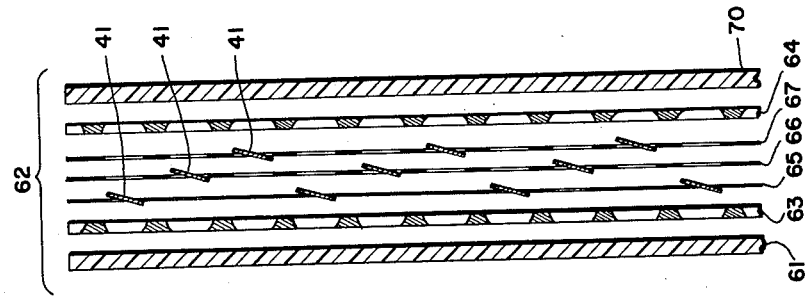
FIGURE 2 is a partial cross sectional view of FIGURE 1 taken at section lines 2—2.
Figure 8:
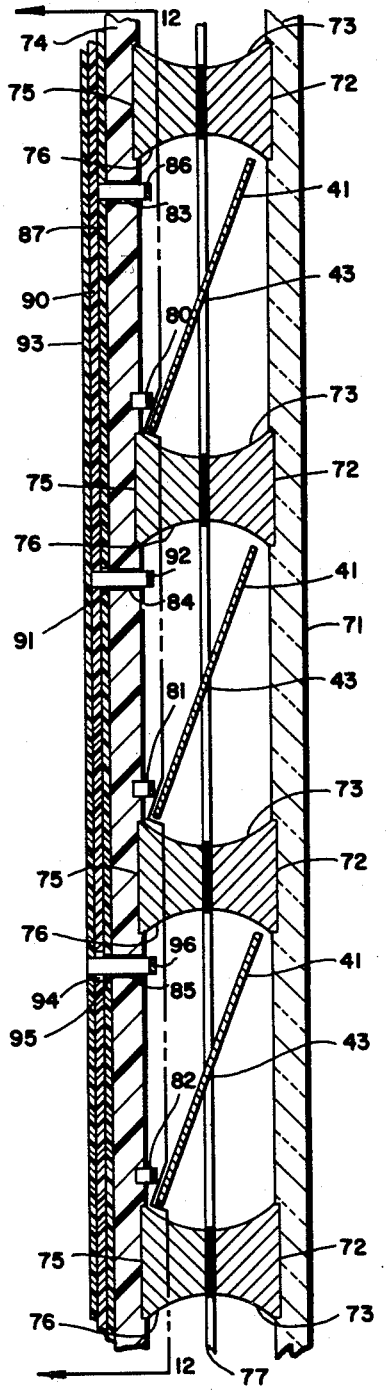
FIGURE 8 is a cross section of a display panel which is a variation of that shown in FIGURE 2.

FIGURE 8 sets forth another embodiment of the invention wherein there are no conductors fastened to light reflecting elements 41. A front sheet of Plexiglas 71 or other suitable transparent material has formed therein a series of grooves 72 in which are located a series of magnets 73. Magnets 73 are of the same type as described earlier in the specification except that for certain applications they may not be formed in a lattice pattern but may consist only of elongated bars, there being one above the light reflecting elements and one below. Another sheet of Plexiglas material 74 or other suitable material which does not necessarily have to be transparent, forms the rear side of the display panel. Also located in element 74 are a series of grooves 75 which hold in position, a plurality of magnets 76. Magnets 76 may be of the type as just described for magnet 73. In any event, magnets 73 and 76 contain magnetic poles such that one pole is towards the front plate 71 and a second pole is at the opposite inner end. A similar magnetic polarity is formed in magnet 76 and between the two innermost poles of magnets 73 and 76 is a sheet of molybdenum permalloy material 77 in which a plurality of reflective elements 41 are cut or etched such as found in FIGURES 4 and 5, except that instead of using three such sheets as shown in FIGURE 2, all of the reflective elements are cut in sheet 77 so that there is a reflective element in each opening of the thin film 77. It should also be noted that hinges 43 support each of the thin film elements, but that there are no conductors such as conductors 52, 53, 54, and 55 on either surface of the reflective elements 41. In order to produce the proper scanning sequence, the conductors such as 54 and 55 are imbedded in plate 74 and are shown as elements 80, 81, and 82, etc. Elements 80, 81, 82, etc. are each individually excited such as shown in FIGURE 5 so that one half the current needed to cause elements 41 to be actuated is applied in the proper scanning sequence to these conductors. Elements such as 80, 81, and 82 extend along the longitudinal axis of elements 41 so that they simulate the operation of and perform the same function as conductor 54 in supplying one half the necessary field to cause movement of element 41. The principle of operation for this embodiment, remaining the same as described for the operation of the element in FIGURE 7. Plate 74 has cut therein a plurality of openings 83, 84, and 85 which are cut in slot like fashion extending longitudinally behind elements 41, which would be adjacent to conductors 54 as found in FIGURE 5 if they were to be used. Situated in opening 83 is a conductor 86 which is formed by pressing a slot like portion from a sheet of copper clad mylar 87 in such a fashion that the portion which is pressed into a U shaped structure extends through the slot like opening 83 so that conductor 86 will be substantially parallel to the reflective element 41, and in one position of element 41 will be adjacent thereto. This may be seen in more detail by viewing FIGURE 12 which shows the conductor 86 as seen from the front. Behind sheet 87 is a second sheet of copper clad mylar 90 which has a U-shaped portion pressed in its surface that extends through an opening 91 which is located in sheet 87 and through opening 84 to emerge adjacent to reflective element 41 as a conductor 82. A third sheet of copper clad mylar 93 is situated behind sheet 90 and has a U-shaped portion formed which extends through an opening 94 in sheet 90 and through another opening 95 in sheet 87 and emerges through opening 85 in plate 74 to form a conductor 96 which also is formed parallel to element 41. It will be noted that in each instance where the U-shaped portion extends through the copper clad mylar sheet, that the openings provided, such as 91, 94, and 95 are of sufficient size that conductors 92 and 96 do not touch the edge of the copper clad facing of sheets 87 and 90, thereby preventing a short circuit. It can be seen that this is an efficient method of forming the conductors adjacent to the reflective thin film elements 41, however, other means such as wire grids or other appropriate conducting means may be used to form the conductors behind the thin film elements. It may also be seen by examination of sheet 87 in FIGURE 12, that it becomes an easy task of connecting together all of the conductors which are used with a reflective element of a particular color. It should be kept in mind that the different conductors which lie behind the reflective elements 41 of one particular color are connected in columns that is, each copper clad mylar sheet such as 87, 90, and 93 has a portion such as 97 and 100 etched away or cut away in some other fashion so that the conducting surfaces form a series of columns and these have been designated as 87, 87a, 87b, etc.; 90, 90a, 90b, etc.; and 93, 93a, 93b, etc.

Figure 10:
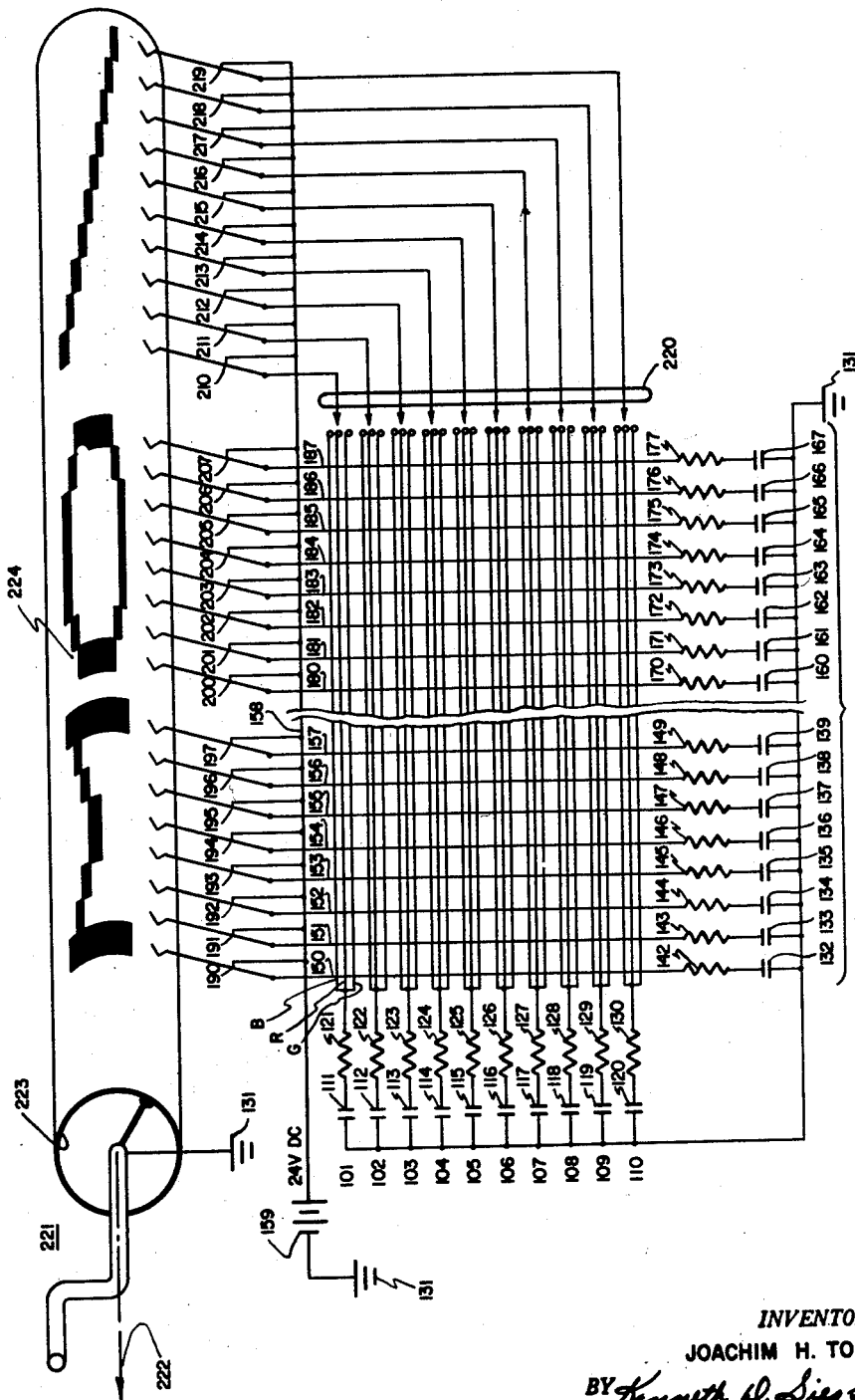
FIGURE 10 is a simplified electrical schematic of the circuits using a drum or punched tape to address a large display panel such as a billboard.
Figure 12:
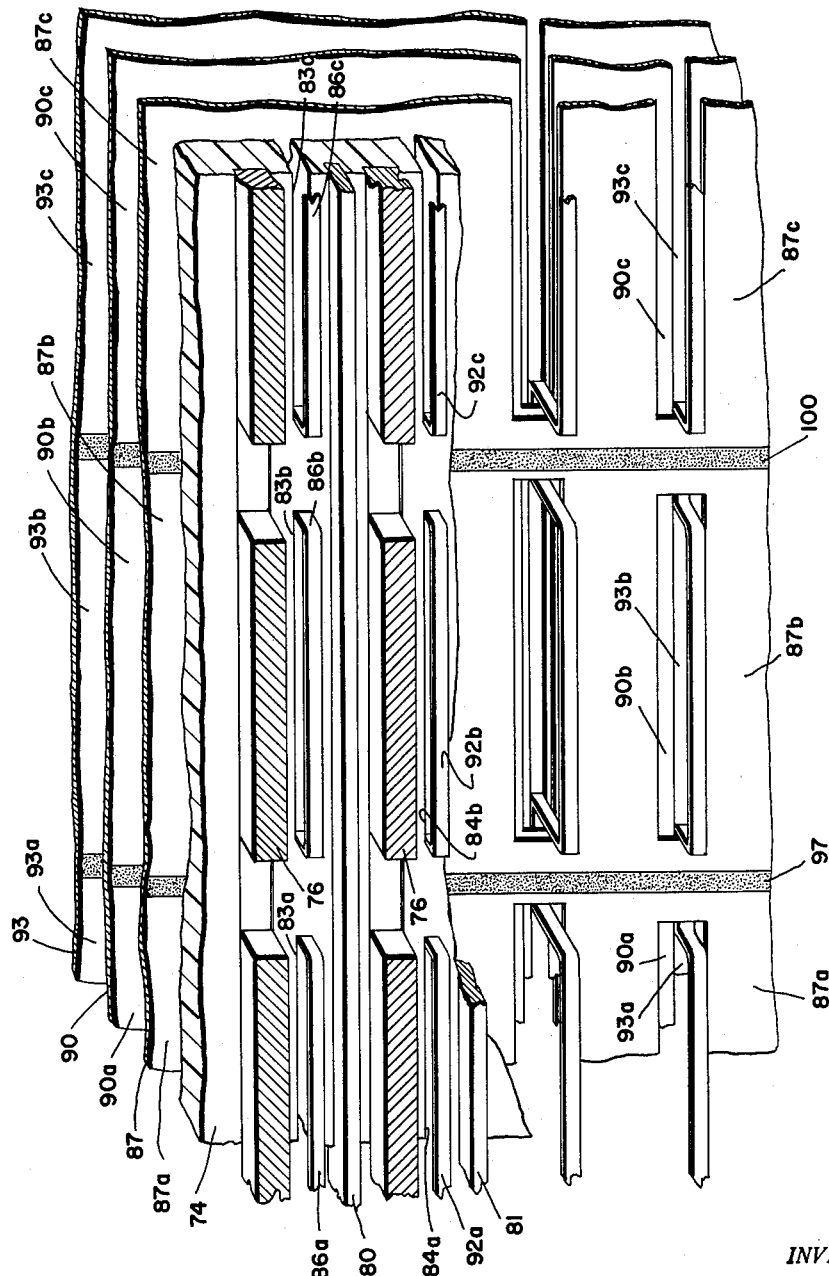
FIGURE 12 is a front view of FIGURE 8 taken along section lines 12—12.

For some applications of my invention, such as in a large advertising display or billboard it may be desirous to create moving images or animated characters and therefore I have shown in FIGURE 10, a simplified arrangement for causing movement of certain of the reflective elements 41 to create moving images. To illustrate how a letter or character which is 10 elements high and 8 elements wide would be actuated, the conductors of FIGURE 10 are shown in simplified order so that a better understanding may be obtained in the operation of the panel. It should be kept in mind that where a conductor is shown as a straight line it may, of course, be laid out so that it is actually a conductor which is not straight, but which interconnects the different reflective elements in a particular column. Bearing this in mind, it will be seen that a plurality of rows, 101, 102, 103, 104, 105, 106, 107, 108, 109, and 110 are shown and each row has three conductors such as B, R, and G which designate the conductors such as 54 and 55 for the blue (B), red (R) or green (G) colors or such as conductors 80, 81, and 82 which are shown in FIGURE 8 for the panel in which the row driving conductors are stationary. A plurality of capacitors 111, 112, 113, 114, 115, 116, 117, 118, 119, and 120 have one of their terminals connected to a resistor 121, 122, 123, 124, 125, 126, 127, 128, 129, and 130 respectively, the elements being in rows 101 through 110. The other end of capacitors 111 through 120 is connected to ground 131 through a common lead. Each of resistors 121 through 130 has its remaining terminal connected to all three of the row driving conductors B, R, and G. In other words, each row conductor for each color is connected to ground through a resistor and capacitor connected in series, the color groups being separated into 10 rows. Also connected to ground 131 are 8 capacitors, 132, 133, 134, 135, 136, 137, 138, and 139. Connected to the other terminal of each of capacitors 132 through 139 is a resistor 142, 143, 144, 145, 146, 147, 148, and 149 respectively. The other terminal of resistors 142 through 149 is connected to a column driving conductor such as 52 and 53 as shown in FIGURE 3 or conductors 86, 92, and 96 as shown in FIGURES 8 and 12, the conductors being designated 150, 151, 152, 153, 154, 155, 156, and 157 respectively. A common line element 158 is excited by a direct current source which is shown as a battery 159 that has its negative terminal connected to ground 131. Conductors 150 through 157 make up the 8 element wide conductors for creating a character which is 10 elements high and 8 elements wide. Also connected to ground 131 is a second group of 8 capacitors 160, 161, 162, 163, 164, 165, 166, and 167. Connected to the other terminal of capacitors 160 through 167 is a resistor 170, 171, 172, 173, 174, 175, 176 and 177 respectively. The other terminal of resistors 170 through 177 is connected to a column conductor which performs the same function as conductors 150 through 157 and they are designated as conductors 180, 181, 182, 183, 184, 185, 186, and 187 respectively. This second group of conductors 180 through 187 provide the proper excitation to create a second character which is 10 elements high and 8 elements wide. It will be understood that the panel may take on as many characters as necessary to provide the proper display and that they would have the same configurations as the row conductors and column conductors which have just been described. In order to complete the circuit, for each of the column conductors 150 through 157 and 180 through 187, a plurality of pressure contact switches 190, 191, 192, 193, 194, 195, 196, and 197 are connected to conductors 150 through 157 respectively and a plurality of pressure sensitive contact switches 200, 201, 202, 203, 204, 205, 206, and 207 are connected to conductors 180 through 187 respectively. The movable elements of switches 190 through 197 are connected to conductors 150 through 157 respectively and the stationary contacts of switches 190 through 197 are connected to battery 159 through common lead 158. In similar manner, the movable elements of switches 200 through 207 are connected to conductors 180 through 187 respectively and the fixed contacts are connected to battery 159 through common lead 158. Since column conductors 150 through 157 and 180 through 187 provide only one half the required excitation, if a simultaneous excitation is applied to rows 101 through 110, B, R, or G, in the proper sequence, the reflective element will be actuated and cause light to be reflected towards the observer. Therefore, 10 pressure contact switches 210, 211, 212, 213, 214, 215, 216, 217, 218, and 219 have their movable elements connected to conductor B, R, or G of rows 101 through 110 respectively. In FIGURE 10, provision is made by the use of a multiple plug 220 to connect all of the blue, red, or green elements simultaneously. It will be understood that variations may be made in the horizontal scanning circuits so that different rows are energized having mixed colors if it is desirable for providing a greater number of row scanning means so that a color other than the primary colors may be created. Switches 210 through 219 have their stationary terminals connected in a manner similar to the other switches in that they are all connected to battery 159 through common lead 158.

Figure 13:
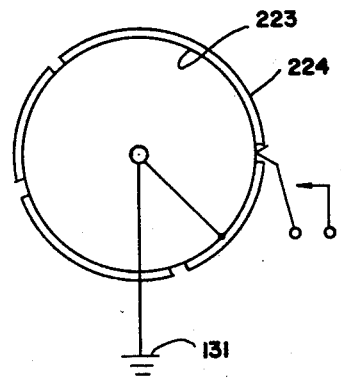
FIGURE 13 is a cross sectional view of the drum which is shown in FIGURE 10.
Figure 11:
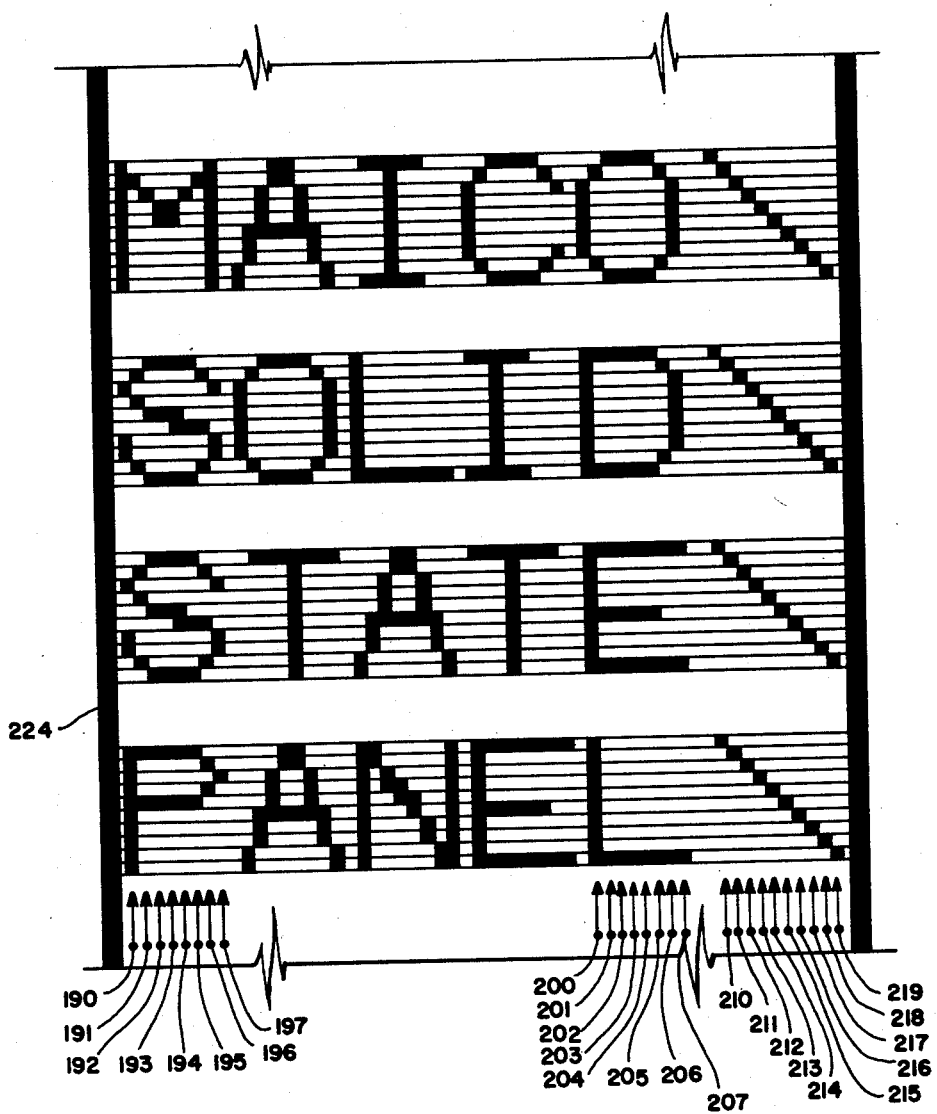
FIGURE 11 is a pictorial view of a commutator element which could be used in conjunction with the schematic diagram of FIGURE 10.

In order to properly actuate the movable arms of switches 190 through 197, 200 through 207, and 210 through 219, a drum 221 is provided which is suitably supported for rotation about a pivotal axis 222. Drum 221 has a conducting surface 223 over which is formed a mask 224 that has etched or cut therein, the characters which are to be formed on the display panel in the shape of slots or cut away areas, there being one for each column such as 190 through 197 and 200 through 207 as well as one for each row switch 210 through 219 (see FIGURE 13). The conducting surface which is generally covered by mask 224 is connected to ground 131 so that a complete circuit may be completed between ground and the proper column or row conductor such as conductor 150 which is connected to resistor 142, capacitor 132 and ground 131 on one side and connected to the movable arm of switch 190 on the other side which may make contact with grounded surface 223. The arrangement of the particular characters to be displayed on the panel is better shown in FIG. 11 which shows the relative arrangement of a 10×8 element character in which there are 10 rows and 8 columns per letter. It will also be noted that there is provided a diagonal line of row contacts so that each row is individually and sequentially energized. Thus as drum 221 is rotated, where none of the pressure sensitive elements of the switches make contact with surface 223, all of the capacitors 111 through 120, 132 through 139, and 160 through 167 are all charged through battery 159. Then as drum 221 is rotated further, and a pressure sensitive switch arm such as 190 drops into one of the openings, the circuit is broken with lead 158 and battery 159. Capacitor 132 discharges through resistor 142, conductor 150 and through ground 131 on drum 221 to complete the circuit. If at the same time, one of the movable switch elements 210 through 218 are in contact with surface 223 through one of the mask openings, the appropriate capacitor 111 through 120 is discharged and the combination of the two currents, one being in the row conductor and the other in the column conductor will cause the reflective element such as 41 to be rotated so that light is reflected towards the observer. Upon further rotation when the pressure sensitive arm again makes contact with its corresponding stationary terminal, current flows in the opposite direction and charges the appropriate capacitors through the row and column conductors to cause reflective element 41 to be snapped or rotated back to its original position. Thus rotation of drum 221 will cause the different characters or symbols to appear on the display panel.

My display panel may also be used in connection with television circuits and different means of scanning the display panel have been developed and are well known to those skilled in the art. One such driving means or scanning means is the type of circuit shown in the A.M. Marks Patent 2,670,402 in which a delay line is used to sequentially scan the different circuit elements. In such a device a driving pulse of very short duration from approximately 0.1 to 0.25 microsecond is used to excite the delay line and the pulse is caused to travel down the length of the delay line where the delay line is terminated in a character impedance. At the appropriate sections along the lumped constant line, a plurality of circuit means are connected to transfer the traveling wave to the appropriate conductor in the display panel, it being understood that there is one row of conductors for each horizontal scan column being actuated so that every third element as previously described which bears the same primary color is actuated. Another patent which shows a suitable driving and scanning means which are applicable to my invention is 2,904,626 which issued to J. A. Rajchman et al. The requirements for the production of colored images on television are well known and are described specifically in "Electronic and Radio Engineering," by F. E. Terman, McGraw-Hill Publishing Company, 4th Edition, pages 999–1010, and specifically in FIGURES 25–21 and 25–26. In accordance with United States standards, there is generally produced 525 lines which would correspond to 525 rows and approximately 700 columns. The television receiver in such a circuit demodulates the incoming color television signal and produces pulses or signals representative of the colors in the appropriate component magnitudes.

Figure 9:
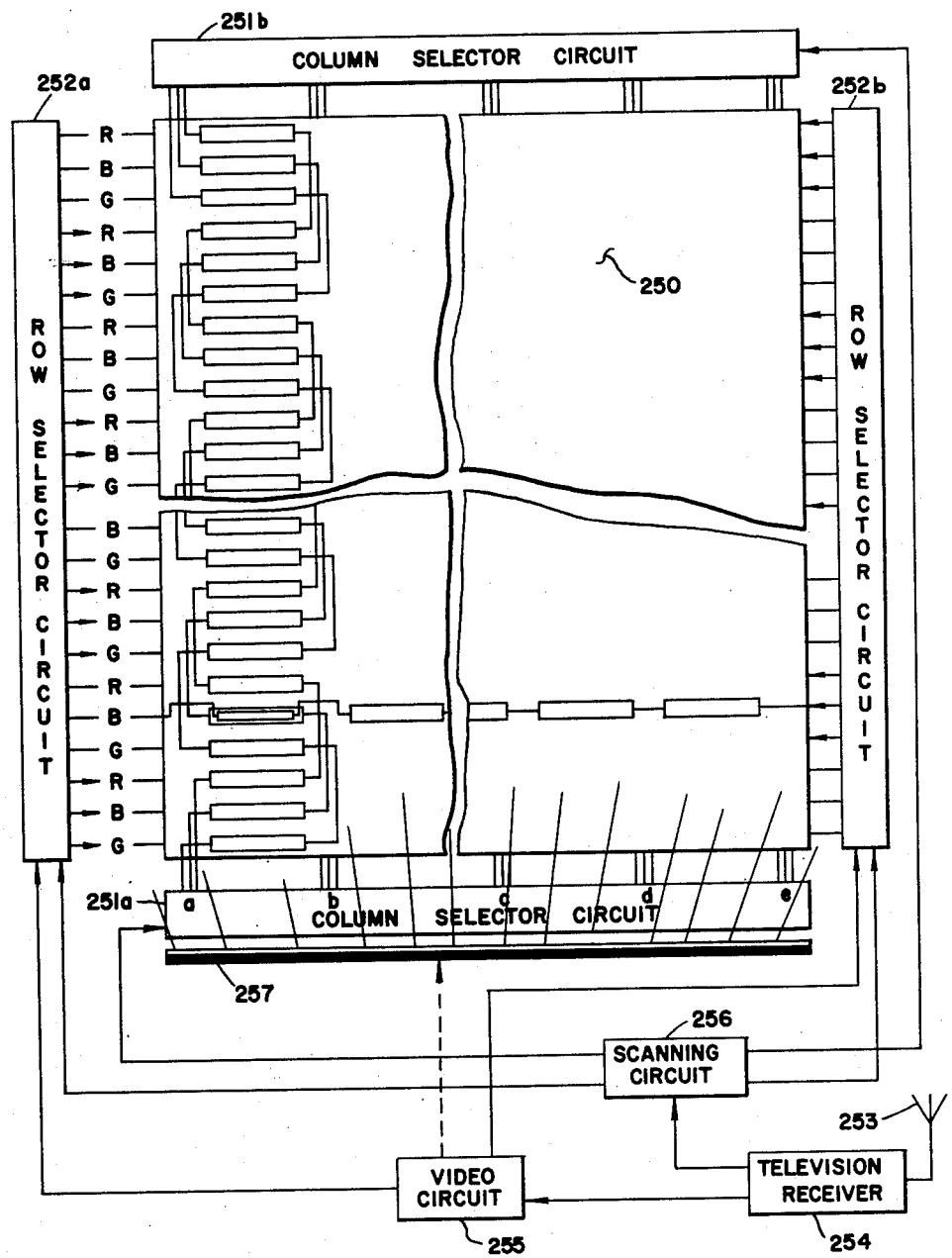
FIGURE 9 is a block diagram showing the relative electrical circuits and their relation to the display panel employed as a television display.

FIGURE 9 shows a display panel 250 which consists of a number of columns and rows such as described earlier in the specification and which is shown in the corresponding drawings. It will be noted that the reflective elements which are of one color are all interconnected in each column and they in turn are connected to a column selector circuit 251a and 251b which for some applications may be combined into one column selector circuit which is adjacent the panel on one side. In like manner, a row selector circuit 252a an 252b is used to provide the proper scanning voltage to the different rows of elements, it also being understood that one selector circuit may be used where the return conductors from the opposite side of the panel are brought back to the row selector circuit so that a complete circuit is formed. Row selector circuits 252a and 252b may be scanned in a sequence so that an interlaced scanning scheme is followed such as employed in television scanning. That is, the three primary colors, of rows 1, 3, 5, etc. may be scanned and the three primary colors, of rows 2, 4, 6, etc. will be scanned so that the scans interlace each other. To receive the television images, an antenna 253 receives the transmitted signals and applies them to a television receiver 254. The television receiver acts on the signals such as described in the text previously mentioned by Terman, but basically demodulates the signals and separates them so that the video signals are separated from the driving and scanning signals. The video signals are applied to a video circuit 255 and the scanning signals are applied to a scanning circuit 256. In my invention, for this particular application, the video signal from video circuit 255 is applied to row selector circuit 255a and 255b, but for other applications it may be more desirous to apply the signals from video circuit 255 to column selector circuit 251a and 251b. The video circuit 255 in one form of my invention develops a plurality of signals whose amplitude varies in accordance with the television image information which is to be applied to panel 250. Scanning circuit 256 actuates the proper row selector circuit 255a and 255b as well as the proper column selector circuit 251a and 251b so that the proper row and column pulses or signals arrive at the same reflective element to produce a rotation of the element and thereby change the amount of light reflected from a light source 257 by the element. In order to achieve the proper luminescence or intensity of light, the video circuit 255 will apply a voltage to row selector circuit 252a and 252b to cause the reflective element to rotate proportionally with the required amount of luminescence or light intensity. For applications other than television, such as radar where a P.P.I. (Plan Position Indicator) is used, the display panel 250 may take on the shape of a circular panel and this may be accomplished where the columns are formed in spiral fashion and where the circuits for each column and row are separated every 360°. The columns and rows may also be arranged in concentric circles where each circle has the row scanning circuits applied to it, and where the elements appear in substantially a straight radial line, they are interconnected in column fashion. In any event, the operation is substantially the same as that for a television display panel. There are some requirements which must be met by a display panel reproducing television or radar images where the panel must have the proper circuits or have the properties built therein, so that the proper delay will be instituted into the reflective element since the signals will generally be in the range of 250 millimicroseconds which would correspond to a four megacycle band width. It is obvious that the panel must have the elements rotate and since the elements may be made of a magnetic material, such as the molybdenum permalloy, which has a nickel and iron content, the element itself becomes capable of magnetic storage and may store the pulses of short duration for periods of time sufficient to allow the elements to rotate and provide the proper visual indication.

It should also be obvious to those skilled in the art that certain modifications and alterations may be made to my invention which fall within the scope of my teaching. A phosphorescence or luminescent material can be applied to the reflective elements and the light source can be replaced by an ultraviolet light source so that the display panel could be operated in relatively dark surroundings and could appear to have no outside light source. It is also anticipated that other forms of light sources may be used such as polarized light where certain of the reflectors are polarized for one light source and the other reflectors are polarized for the other light sources. My panel may be used in the form of a "blackboard" for certain applications by "writing" on it with a magnetic "pencil" to cause the reflected elements to be aligned in one direction only when the magnet is passed adjacent to the thin film elements. Reversal of the magnet will cause the elements to realign themselves as they were in their orginal state so that the writing may be erased in part. To completely erase the panel, a voltage of the proper polarity and magnitude may be applied to the row and column conductors to place all the elements in the condition of being erased. I intend to cover all modifications and variations of my invention by the appended claims and wish to be limited only by the spirit and scope of my invention as defined by the claims.

What I claim is:

1. A display panel for producing visual images for an observer comprising: thin film means having magnetic properties and light reflecting surfaces adapted for limited movement under predetermined conditions; current conducting means cooperating with said thin film means for conducting a plurality of energizing currents therethrough to control the movement of said thin film means; magnetic field producing means producing a magnetic field of sufficient strength to magnetically influence said thin film means and located adjacent said current conducting means for controlling the position of said thin film means; and intermittently controlled energizing means connected to said current conducting means for intermittently energizing said current conducting means so that light is directed towards and away from said observer whereby images are produced on said panel.

2. The invention as set forth in claim 1 including a light means positioned outside said magnetic field producing means and directing its light rays toward said light reflecting surfaces so that upon being moved, said light reflecting surface is fully illuminated in a first predetermined position and non-illuminated in a second predetermined position.

3. The invention as set forth in claim 2, wherein said intermittently controlled energizing means includes a television receiver for receiving transmitted television signals and producing output signals representative thereof; scanning circuits responsive to said receiver output signals to provide the proper synchronization signals for horizontal and vertical scanning; first and second selector circuits responsive to said scanning circuits for energizing said current conducting means; and video frequency circuit means responsive to said receiver output signals connected to one of said first and second selector circuits to provide a modulating voltage representative of said image to be produced.

4. A display panel for producing visual images for an observer comprising: thin film means having magnetic properties and light reflecting surfaces adapted for limited rotational movement under predetermined conditions; current conducting means fixedly and insulatedly attached to said thin film means for conducting a plurality of energizing currents therethrough to control the rotational movement of said thin film means; magnetic field producing means adjacent said current conducting means for controlling the rotational position of said thin film means; and intermittently controlled energizing means connected to said current conducting means for intermittently energizing said current conducting means so that light is directed towards and away from said observer whereby images are produced on said panel.

5. A display panel for producing visual images for an observer comprising: thin film means having magnetic properties and light reflecting surfaces adapted for limited movement under predetermined conditions; current conducting means fixedly positioned adjacent to said thin film means for conducting a plurality of energizing currents therethrough to control the movement of said thin film means; magnetic field producing means producing a magnetic field of sufficient strength to magnetically influence said thin film means and located adjacent said current conducting means for controlling the position of said thin film means; and intermittently controlled energizing means connected to said current conducting means for intermittently energizing said current conducting means so that light is directed towards and away from said observer whereby images are produced on said panel.

6. A display panel for producing visual images for an observer comprising: a plurality of movable light reflecting elements including supporting members having magnetic properties; a plurality of first electrical current conducting means for conducting current in a first direction, there being at least one cooperating with each of a first surface of said plurality of movable light reflecting elements; a plurality of first interconnecting means for interconnecting said plurality of first electrical current conducting means; a plurality of second electrical current conducting means for conducting current in a direction opposite to said first direction, there being at least one cooperating with each of a second surface of said plurality of movable light reflecting elements; a plurality of second interconnecting means for interconnecting said plurality of second electrical current conducting means; and first and second magnetic lattices having a plurality of openings therein framing said plurality of movable light reflecting elements and fixedly holding said supporting members in sandwiched relation to cooperate with said plurality of first and second electrical conducting means so that said light reflecting elements are moved to a predetermined position upon said first and second electrical conducting means being energized.

7. The invention as set forth in claim 6 wherein said first and second magnetic lattices are positioned between a pair of transparent sheets and fixedly held in position thereby.

8. The invention as set forth in claim 7 including a light source positioned outside said first and second magnetic lattices and directing its light rays toward said light reflecting elements so that said light reflecting surface is illuminated in a first predetermined position and non-illuminated in a second predetermined position.

9. A display panel for producing visual images for an observer comprising: a plurality of movable light reflecting elements including supporting members having magnetic properties; a plurality of first electrical current conducting means for conducting current therethrough, there being at least one on each of said plurality of movable light reflecting elements; a plurality of first interconnecting means for interconnecting certain of said plurality of first electrical current conducting means; a plurality of second electrical current conducting mean for conducting current therethrough, there being at least one on each of said plurality of movable light reflecting elements; a plurality of second interconnecting means for interconnecting certain of said plurality of second electrical current conducting means; and first and second magnetic means having a plurality of openings therein framing said plurality of movable light reflecting elements and fixedly holding said supporting members in sandwiched relation to cooperate with said plurality of first and second electrical conducting means so that said light reflecting elements are moved to a predetermined position upon said first and second electrical conducting means being energized.

10. A display panel for producing visual images for an observer comprising: a plurality of thin film rotatable light reflecting elements including supporting members having magnetic properties and at least one light reflective surface; a plurality of first electrical current conducting means for conducting current in a first direction, there being at least one on each of said light reflective surface of said plurality of movable light reflecting elements; a plurality of first interconnecting means for interconnecting said plurality of first electrical current conducting means so that they form a first plurality of lines described by a geometrical construction; a plurality of second electrical current conducting means for conducting current in a direction opposite to said first direction, there being at least one on each surface opposite said light reflective surface of said plurality of movable light reflecting elements; a plurality of second interconnecting means for interconnecting said plurality of second electrical current conducting means so that they form a second plurality of lines described by a geometrical construction; and first and second magnetic means having a plurality of openings therein framing said plurality of rotatable light reflecting elements and fixedly holding said supporting members in sandwiched relation to cooperate with said plurality of first and second electrical conducting means so that said light reflecting elements are moved to a predetermined position upon said first and second electrical conducting means being energized.

11. A display panel for producing visual images for an observer comprising: a first, second, and third plurality of movable light reflecting elements including supporting members having magnetic properties, said elements arranged in columns and rows; a plurality of first electrical current conducting means for conducting current therethrough, there being at least one associated with each of said plurality of movable light reflecting elements; a plurality of first connecting means for connecting independently in rows, all of said plurality of said first electrical current conducting means; a plurality of second electrical current conducting means for conducting current therethrough, there being at least one associated with each of said plurality of movable light reflecting elements; a plurality of second connecting means for connecting independently in columns, all of said plurality of second electrical current conducting means associated with said first plurality of light reflecting elements; a plurality of third connecting means for connecting independently in columns, all of said plurality of second electrical current conducting means associated with said second plurality of light reflecting elements; a plurality of fourth connecting means for connecting independently in columns, all of said plurality of second electrical current conducting means associated with said third plurality of light reflecting elements; and first and second magnetic means having a plurality of openings therein framing said plurality of movable light reflecting elements and fixedly holding said supporting members in sandwiched relation to cooperate with said plurality of first and second electrical conducting means so that said light reflecting elements are moved to a predetermined position upon said first and second electrical conducting means being energized.

12. A display panel for producing visual images for an observer comprising: a first, second, and third plurality of thin film rotatable light reflecting elements including supporting members having magnetic properties, said elements arranged in columns and rows; a plurality of first electrical current conducting means for conducting current in a first direction, there being at least one on each of a first surface of said plurality of movable light reflecting elements; a plurality of first connecting means for connecting independently in rows, all of said plurality of said first electrical current conducting means; a plurality of second electrical current conducting means for conducting current in a direction opposite to said first direction, there being at least one on each of a second surface of said plurality of movable light reflecting elements; a plurality of second connecting means for connecting independently in columns, all of said plurality of second electrical current conducting means on said first plurality of light reflecting elements; a plurality of third connecting means for connecting independently in columns, all of said plurality of second electrical current conducting means on said second plurality of light reflecting elements; a plurality of fourth connecting means for connecting independently in columns, all of said plurality of second electrical current conducting means on said third plurality of light reflecting elements; and first and second magnetic means having a plurality of openings therein framing said plurality of rotatable light reflecting elements and fixedly holding said supporting members in sandwiched relation to cooperate with said plurality of first and second electrical conducting means so that said light reflecting elements are moved to a predetermined position upon said first and second electrical conducting means being energized.

13. A display panel for producing visual images for an observer comprising: a first, second, and third plurality of movable light reflecting elements including supporting members having magnetic properties, said elements arranged in symmetrical patterns about lines described by a geometrical construction; a plurality of first electrical current conducting means for conducting current in a first direction, there being at least one on each of said plurality of movable light reflecting elements; a plurality of first connecting means for connecting independently in a first line described by a geometrical construction all of said plurality of said first electrical current conducting means; a plurality of second electrical current conducting means for conducting current in a direction opposite to said first direction, there being at least one on each of said plurality of movable light reflecting elements; a plurality of second connecting means for connecting independently in a second line described by a geometrical construction, all of said plurality of second electrical current conducting means on said first plurality of light reflecting elements; a plurality of third connecting means for connecting independently in a third line parallel to said second line all of said plurality of said electrical current conducting means on said second plurality of light reflecting elements; a plurality of fourth connecting means for connecting independently in a fourth line parallel to said second line, all of said plurality of second electrical current conducting means on said third plurality of light reflecting elements; and first and second magnetic means having a plurality of openings therein framing said plurality of movable light reflecting elements and holding said supporting members in sandwiched relation to cooperate with said plurality of first and second electrical conducting means so that said light reflecting elements are moved to a predetermined position upon said first and second electrical conducting means being energized.

14. A display panel for producing visual images for an observer comprising: a first sheet of thin film material having magnetic properties and a plurality of openings, one third of which have formed therein, a first plurality of movable light reflecting elements including supporting members, said openings being arranged in columns and rows; a second sheet of thin film material having magnetic properties overlying said first sheet and having a plurality of openings, one third of which have formed therein, a second plurality of movable light reflecting elements including supporting members, said openings being arranged in columns and rows but situated so that all of said light reflecting elements are exposed in different openings; a third sheet of thin film material having magnetic properties overlying said first and second sheets and having a plurality of openings, one third of which have formed therein, a third plurality of movable light reflecting elements including supporting members, said openings being arranged in columns and rows but situated so that all of said light reflecting elements are exposed in different openings; a first electrical current conductor attached about the edge of each of said light reflecting elements for conducting current in a first direction; a second electrical current conductor attached about the edge of each of said light reflecting elements for conducting current in a second direction; a plurality of first connecting means for connecting independently in rows, all of said plurality of said first electrical current conductors; a plurality of second connecting means for connecting independently in columns, all of said plurality of second electrical current conductors on said first plurality of light reflecting elements; a plurality of third connecting means for connecting independently in columns, all of said plurality of second electrical current conductors on said second plurality of light reflecting elements; a plurality of fourth connecting means for connecting independently in columns, all of said plurality of second electrical current conductors on said third plurality of light reflecting elements; and first and second magnetic means having a plurality of openings therein framing said plurality of movable light reflecting elements and fixedly holding said first, second, and third sheets of thin film material in sandwiched relation to cooperate with said plurality of first and second electrical conducting means so that said light reflecting elements are moved to a predetermined position upon said first and second electrical conducting means being energized.

15. A display panel for producing visual images for an observer comprising: a sheet of thin film material having magnetic properties and a plurality of openings, said openings having formed therein, a first, second, and third plurality of movable light reflecting elements including supporting members, all of said openings being arranged in columns and rows but situated so that all of said light reflecting elements are exposed in different openings; a first electrical current conductor positioned adjacent to the edge of each of said light reflecting elements for conducting current therethrough a second electrical current conductor positioned adjacent to the edge of each of said light reflecting elements for conducting current therethrough; a plurality of first connecting means for connecting independently in rows, all of said plurality of said first electrical current conductors; a plurality of second connecting means for connecting independently in columns, all of said plurality of second electrical current conductors positioned adjacent to said first plurality of light reflecting elements; a plurality of third connecting means for connecting independently in columns, all of said plurality of second electrical current conductors positioned adjacent to said second plurality of light reflecting elements; a plurality of fourth connecting means for connecting independently in columns, all of said plurality of second electrical current conductors positioned adjacent to said third plurality of light reflecting elements; and first and second magnetic means having a plurality of openings therein framing said plurality of movable light reflecting elements and fixedly holding said sheet of thin film material in sandwiched relation to cooperate with said plurality of first and second electrical conducting means so that said light reflecting elements are moved to a predetermined position upon said first and second electrical conducting means being energized.

16. The invention as set forth in claim 15 wherein said plurality of second, third, and fourth connecting means are formed from three adjacently positioned low resistance metal clad plastic sheets in which U-shaped members have been formed therein, two of said sheets having openings formed therein to allow said U-shaped members to insulatedly extend therethrough.

17. The invention as set forth in claim 16 wherein said first and second magnetic means are positioned between a pair of sheets one of which may be transparent to be fixedly held in position thereby, one of said sheets having slots formed therein so that said U-shaped members extend therethrough to be positioned adjacent to said first and second electrical current conductors.

18. A display panel for producing color visual images for an observer by adding primary colors comprising: a first sheet of thin film material having magnetic properties and a plurality of openings, one third of which have formed therein, a first plurality of rotatable light reflecting elements of a first primary color including supporting members, said openings being arranged in columns and rows; a second sheet of thin film material having magnetic properties overlying said first sheet and having a plurality of openings, one third of which have formed therein, a second plurality of rotatable light reflecting elements of a second primary color including supporting members, said openings being arranged in columns and rows but situated so that said light reflecting elements of said first and second primary colors are exposed in different openings; a third sheet of thin film material having magnetic properties overlying said first and second sheets and having a plurality of openings, one third of which have formed therein, a third plurality of rotatable light reflecting elements of a third primary color including supporting members, said openings being arranged in columns and rows but situated so that said light reflecting elements of said first, second, and third primary colors are exposed in different openings; a first electrical current conductor attached about the edge of each of said light reflecting elements for conducting current in a first direction; a second electrical current conductor attached about the edge of each of said light reflecting elements for conducting current in a second direction; a plurality of first connecting means for connecting independently in rows, all of said plurality of said first electrical current conductors; a plurality of second connecting means for connecting independently in columns, all of said plurality of second electrical current conductors on said first plurality of light reflecting elements; a plurality of third connecting means for connecting independently in columns, all of said plurality of second electrical current conductors on said second plurality of light reflecting elements; a plurality of fourth connecting means for connecting independently in columns, all of said plurality of second electrical current conductors on said third plurality of light reflecting elements; and first and second magnetic grid means having a plurality of openings therein framing said plurality of rotatable light reflecting elements in a magnetic field and fixedly holding said first, second, and third sheets of thin film material in sandwiched relation to cooperate with said plurality of first and second electrical conducting means so that said light reflecting elements are rotated to a predetermined position upon said first and second electrical conducting means being energized.

19. The invention as set forth in claim 18 wherein said first and second magnetic means are positioned between a pair of transparent sheets and fixedly held in position thereby.

20. The invention as set forth in claim 19 including a light source positioned outside said first and second magnetic lattices and directing its light rays toward said light reflecting elements so that said light reflecting surface is illuminated in a first predetermined position and nonilluminated in a second predetermined position.

References Cited in the file of this patent
UNITED STATES PATENTS

| | | |
|---|---|---|
| 2,058,882 | Ives | Oct. 27, 1936 |
| 2,562,793 | Johnson | July 31, 1951 |